United States Patent
Shim et al.

(10) Patent No.: US 8,782,018 B2
(45) Date of Patent: Jul. 15, 2014

(54) STORAGE DEVICE AND DATA PROCESSING DEVICE UTILIZING DETERMINED DICTIONARY COMPRESSION

(75) Inventors: Eok-soo Shim, Suwon-si (KR); Jeong-beom Seo, Seoul (KR); Jin-kyu Kim, Seoul (KR); Min-Wook Jung, Busan (KR)

(73) Assignee: Samsung Electronics Co., Ltd. (KR)

( * ) Notice: Subject to any disclaimer, the term of this patent is extended or adjusted under 35 U.S.C. 154(b) by 31 days.

(21) Appl. No.: 13/487,527

(22) Filed: Jun. 4, 2012

(65) Prior Publication Data

US 2013/0006981 A1  Jan. 3, 2013

(30) Foreign Application Priority Data

Jun. 3, 2011  (KR) .................. 10-2011-0054140

(51) Int. Cl.
*G06F 17/30* (2006.01)

(52) U.S. Cl.
USPC ........... 707/693; 707/781; 707/713; 707/955; 707/809; 707/706

(58) Field of Classification Search
USPC .................. 707/706, 693, 781, 713, 955, 809
See application file for complete search history.

(56) References Cited

U.S. PATENT DOCUMENTS 5,870,036 A  2/1999  Franaszek et al.
2012/0265737 A1*  10/2012  Potkonjak .................... 707/693

FOREIGN PATENT DOCUMENTS

| JP | 07-288475 | 10/1995 |
| JP | 2001-044850 | 2/2001 |
| KR | 1997-0059917 | 8/1997 |

* cited by examiner

*Primary Examiner* — Sana Al Hashemi
(74) *Attorney, Agent, or Firm* — Myers Bigel Sibley & Sajovec, P.A.

(57) ABSTRACT

A data processing device for a storage device can include a dictionary storage unit that is configured to store a plurality of dictionaries and a compression unit that is configured to determine a selected dictionary from the plurality of dictionaries based on received data, and compress the received data using the selected dictionary to provide compressed data. Each of the plurality of dictionaries can include a plurality of pattern-symbol correspondence relations defining a one-to-one correspondence between respective ones of a plurality of patterns and respective ones of a plurality of symbols.

16 Claims, 16 Drawing Sheets

FIG. 3

| | PATTERN | SYMBOL |
|---|---|---|
| FP | 0b 0001 0001 0001 | 1 |
| | 0b 0010 0010 0010 | 2 |
| | 0b 1000 0001 0001 | 3 |
| | 0b 1001 0100 1000 | 4 |
| | 0b 0101 1100 0011 | 5 |
| | 0b 1101 0001 0110 | 6 |
| RP | Reserved | 7 |
| | Reserved | 8 |

FIG. 5

| CDIC-1 | |
|---|---|
| PATTERN | SYMBOL |
| 0b 0001 0001 0001 | 1 |
| 0b 0010 0010 0010 | 2 |
| 0b 1000 0001 0001 | 3 |
| 0b 1001 0100 1000 | 4 |

COMMON PORTION

| DIC-1 | |
|---|---|
| PATTERN | SYMBOL |
| 0b 0001 0001 0001 | 1 |
| 0b 0010 0010 0010 | 2 |
| 0b 1000 0001 0001 | 3 |
| 0b 1001 0100 1000 | 4 |
| 0b 0101 1100 0011 | 5 |
| 0b 1101 0001 0110 | 6 |
| Reserved | 7 |
| Reserved | 8 |

| DIC-2 | |
|---|---|
| PATTERN | SYMBOL |
| 0b 0001 0001 0001 | 1 |
| 0b 0010 0010 0010 | 2 |
| 0b 1000 0001 0001 | 3 |
| 0b 1001 0100 1000 | 4 |
| 0b 1111 0000 1010 | 5 |
| 0b 0000 0110 1101 | 6 |
| 0b 1001 1101 0110 | 7 |
| 0b 0001 1000 1101 | 8 |
| 0b 0010 1001 1111 | 9 |
| ... | ... |
| 0b 0010 1000 1100 | 14 |
| Reserved | 15 |
| Reserved | 16 |

| DIC-L | |
|---|---|
| PATTERN | SYMBOL |
| 0b 0001 0001 0001 | 1 |
| 0b 0010 0010 0010 | 2 |
| 0b 1000 0001 0001 | 3 |
| 0b 1001 0100 1000 | 4 |
| 0b 0101 1010 1100 | 5 |
| 0b 1100 1010 0011 | 6 |
| 0b 0010 0110 0011 | 7 |
| 0b 0110 0010 1100 | 8 |
| 0b 1001 1001 0010 | 9 |
| 0b 0110 1111 0011 | 10 |
| 0b 1001 1110 0010 | 11 |
| 0b 0010 1101 1110 | 12 |
| ... | ... |
| 0b 0010 0101 1011 | 125 |
| Reserved | 126 |
| Reserved | 127 |
| Reserved | 128 |

DICS-1

FIG. 10

DIC-1

FT-1

| PATTERN | SYMBOL |
|---|---|
| 0b 0001 0001 0001 | 1 |
| 0b 0010 0010 0010 | 2 |
| 0b 1000 0001 0001 | 3 |
| 0b 1001 0100 1000 | 4 |
| 0b 0101 1100 0011 | 5 |
| 0b 1101 0001 0110 | 6 |
| Reserved | 7 |
| Reserved | 8 |

FP: rows 1-6
RP: rows 7-8

AT-1

| PATTERN | SYMBOL |
|---|---|
| Reserved | 1 |
| Reserved | 2 |
| Reserved | 3 |
| Reserved | 4 |
| Reserved | 5 |
| Reserved | 6 |
| Reserved | 7 |
| Reserved | 8 |

STORAGE DEVICE AND DATA PROCESSING DEVICE UTILIZING DETERMINED DICTIONARY COMPRESSION

CROSS-REFERENCE TO RELATED APPLICATIONS

This application claims the benefit of Korean Patent Application No. 10-2011-0054140, filed on Jun. 3, 2011, in the Korean Intellectual Property Office, the disclosure of which is incorporated herein in its entirety by reference.

BACKGROUND

The inventive concept relates to a storage device and a data processing device for the storage device.

Data is compressed before the data is stored in a storage device whereby a storage space is efficiently used, and the number of programming of data or reading of data is reduced, which increases a lifespan of the storage device.

SUMMARY

According to an aspect of the inventive concept, a data processing device for a storage device can include a dictionary storage unit that is configured to store a plurality of dictionaries and a compression unit that is configured to determine a selected dictionary from the plurality of dictionaries based on received data, and compress the received data using the selected dictionary to provide compressed data. Each of the plurality of dictionaries can include a plurality of pattern-symbol correspondence relations defining a one-to-one correspondence between respective ones of a plurality of patterns and respective ones of a plurality of symbols.

In some embodiments according to the inventive concept, the selected dictionary is determined based on a type of the received data and a size of the received data. In some embodiments according to the inventive concept, each of the plurality of dictionaries is included in one of a plurality of dictionary sets and the compression unit is configured to determine a selected dictionary set comprising one of the dictionary sets based on the type of the received data and determine the selected dictionary included in the selected dictionary set based on the size of the received data.

In some embodiments according to the inventive concept, each of the plurality of dictionary sets includes a common dictionary including a pattern-symbol correspondence relation that has in common with the plurality of dictionaries included in the each of the plurality of dictionary sets.

In some embodiments according to the inventive concept, the compression unit is configured to compress the received data using the common dictionary included in the selected dictionary set after the selected dictionary set is determined and before the selected dictionary is determined and compress the data using the selected dictionary after the selected dictionary is determined.

In some embodiments according to the inventive concept, the compression unit includes a loading unit with a preset region and a load region, where a plurality of common dictionaries included in the plurality of dictionary sets is loaded in the preset region. In some embodiments according to the inventive concept, the compression unit is configured to load the selected dictionary from the dictionary storage unit to the load region of the loading unit. In some embodiments according to the inventive concept, the compression unit is configured to compress the received data using the common dictionary included in the selected dictionary set after the selected dictionary set is determined and before the selected dictionary is loaded to the loading unit, and compress the received data using the selected dictionary after the selected dictionary is loaded to the loading unit.

In some embodiments according to the inventive concept, the device further includes an updating unit that is configured to extract an additional pattern from the received data and add the additional pattern to the plurality of dictionaries. In some embodiments according to the inventive concept, each of the plurality of dictionaries includes a fixed table and an additional table, where the fixed table includes a fixed pattern portion in which the plurality of patterns are defined and a reserved pattern portion in which the plurality of patterns are not defined, wherein the updating unit is configured to add the additional pattern in the reserved pattern portion of the fixed table if the fixed table is not saturated, and add the additional pattern in the additional table if the fixed table is saturated.

In some embodiments according to the inventive concept, the compressed data includes a selected dictionary instruction field to indicate the selected dictionary and a compression data field to indicate a data pattern included in the data and compressed using the selected dictionary, where the compression data field includes a table instruction unit indicating the fixed table or the additional table which defines the data pattern. In some embodiments according to the inventive concept, the additional pattern is a candidate to be deleted from the plurality of dictionaries.

In some embodiments according to the inventive concept, the device can also include a decryption unit that is configured to receive the compressed data and reconstruct the data by decrypting the compressed data using the selected dictionary. In some embodiments according to the inventive concept, In some embodiments according to the inventive concept, a storage device can include a compression unit that is configured to determine a selected dictionary that is one of a plurality of dictionaries based on received data, compress the received data using the selected dictionary to provide compressed data. A memory can be configured to store the plurality of dictionaries and store the compressed data, where each of the plurality of dictionaries includes a plurality of pattern-symbol correspondence relations defining a one-to-one correspondence between respective ones of a plurality of patterns and respective ones of a plurality of symbols.

In some embodiments according to the inventive concept, the memory can be a flash memory.

In some embodiments according to the inventive concept, a method of operating a solid state disk drive (SSD) can be provided by selecting a dictionary for use in compressing received data to provide a selected dictionary, from among a plurality of dictionaries, based on a type of the received data and based on a size of the received data. A symbol stored in the selected dictionary can be accessed using the received data as an index into the dictionary. The symbol can be included as part of compressed data for storage in the SSD.

In some embodiments according to the inventive concept, the type can be text data, image data, audio data, or video data. In some embodiments according to the inventive concept, the size of the data can be a range of values of the received data.

In some embodiments according to the inventive concept, selecting a dictionary can be provided by selecting the plurality of dictionaries based on the type of the received data to provide a selected dictionary set and then selecting the dictionary to provide the selected dictionary based on the size of the received data.

In some embodiments according to the inventive concept, accessing a symbol stored in the selected dictionary can further include accessing a common dictionary included in the selected dictionary set using the received data to index into the common dictionary to provide a common symbol before the selected dictionary is determined and then accessing the selected dictionary included in the selected dictionary set using the received data to index into the selected dictionary to provide the symbol after the selected dictionary is determined.

In some embodiments according to the inventive concept, each of the dictionaries in the plurality of dictionaries other than the common dictionary includes a portion thereof that corresponds to the common dictionary.

BRIEF DESCRIPTION OF THE DRAWINGS

FIG. 3 is a table showing one example of a plurality of dictionaries stored in a dictionary storage unit of FIG. 1;

FIG. 5 is a table showing examples of dictionaries included in a dictionary set among the plurality of dictionaries stored in the dictionary storage unit of FIG. 1;

FIG. 10 is a table showing one example of a dictionary stored in a dictionary storage unit of FIG. 9;

DETAILED DESCRIPTION OF THE EMBODIMENTS ACCORDING TO THE INVENTIVE CONCEPT

Figure 1:
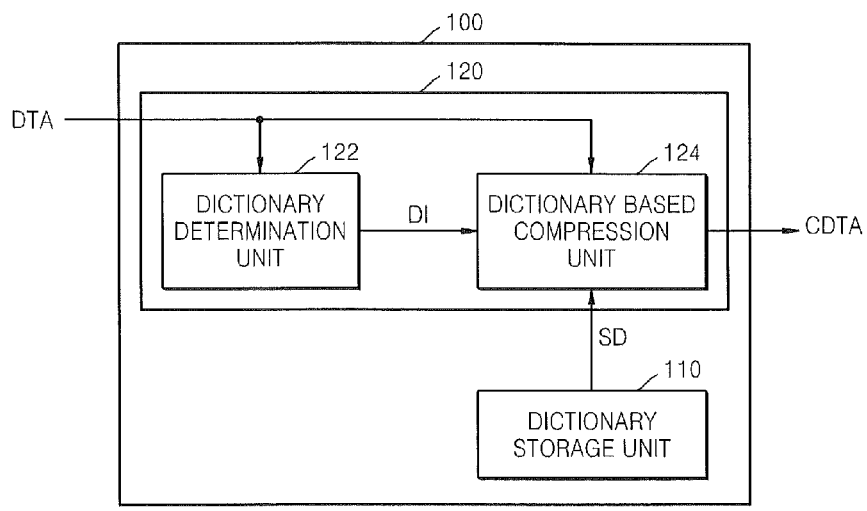
FIG. 1 is a block diagram of a data processing device for a storage device according to an embodiment of the inventive concept.

The present inventive concept will now be described more fully with reference to the accompanying drawings, in which embodiments of the inventive concept are shown. The inventive concept may, however, be embodied in many different forms and should not be construed as being limited to the embodiments set forth herein; rather, these embodiments are provided so that this disclosure will be thorough and complete, and will fully convey the inventive concept to those skilled in the art. In the drawings, the thicknesses of layers and regions are exaggerated for clarity. Like reference numerals in the drawings denote like elements, and thus their description will be omitted.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

In some embodiments according to the inventive concept, a dictionary approach can be used to compress data using both the type of data and the size of the data as indicators of the particular dictionary that should be used to compress the data. For example, the type and size of the data can be based on analysis of the data when the data is received for storage. Once the type of the received data is determined, for example, one of the dictionaries selected for use in compressing the received data. It will be understood that the dictionaries can be structured as look-up tables where the received data is used to index into the table to a particular location that stores an associated symbol that can be used to represent (or encode) the received data so that it is compressed. The compressed data occupies less space than the received data because the selected symbol from the selected dictionary occupies less space than the received data. For example, in some embodiments, the received data can be a string of twelve bits whereas the selected symbol used to represent the twelve bits can be a single bit. It will be understood, therefore, that in some embodiments according to the inventive concept, frequently occurring data patterns may have associated symbols that occupy the least space. Further, the longer a particular frequently occurring received data pattern is, the shorter the symbol used to represent that data may be.

Still further, in some embodiments according to the inventive concept, dictionaries can be organized in "dictionary sets." A particular dictionary set can be selected for use bases on the type of data being compressed and a particular dictionary within the selected set can be selected based on the size of the data received. It will be understood that the term "size" as it relates to "data" includes the range of values that the data may take on. For example, if the data can have 256 different values that will be recognized so that the associated symbol will be used to represent the received data, the data can be said to have a "size" of 256, so that 256 entries in the dictionary may be used. Accordingly, the corresponding dictionary with 256 entries may be used to compress the received data.

Figure 2:
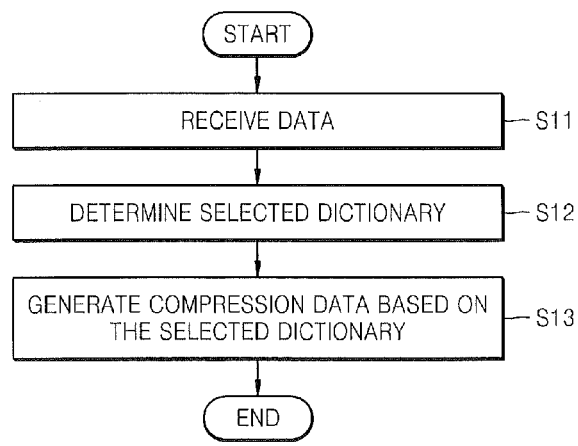
FIG. 2 is a flowchart of a data compression method performed in the data processing device of FIG. 1 according to an embodiment of the inventive concept.

FIG. 1 is a block diagram of a data processing device 100 for a storage device according to an embodiment of the inventive concept. FIG. 2 is a flowchart of a data DTA compression method performed in the data processing device 100 of FIG. 1 according to an embodiment of the inventive concept. FIG. 3 is a table showing one example of a plurality of dictionaries stored in a dictionary storage unit 110 of FIG. 1.

Referring to FIG. 1, the data processing device 100 includes the dictionary storage unit 110 and a compression unit 120. The plurality of dictionaries are stored in the dictionary storage unit 110. The compression unit 120 receives the data DTA and generates compression data CDTA. The compression data 120 may include a dictionary determination unit 122 and the dictionary based compression unit 124.

Referring to FIGS. 1 and 2, the compression unit 120 receives the data DTA (operation S11). The data DTA may be an input/output unit of the data processing device 100.

The dictionary determination unit 122 determines a selected dictionary SD that is one of the plurality of dictionaries stored in the dictionary storage unit 110 based on the data DTA (operation S12). The dictionary based compression unit 124 compresses the data DTA based on the selected dictionary SD and generates the compression data CDTA (operation S13).

The dictionary determination unit 122 may determine the selected dictionary SD based on a type and size of the data DTA. The type of the data DTA may include a text, an image, video, etc.

The dictionary determination unit 122 may transfer dictionary information DI that is information regarding the determined selected dictionary SD to the dictionary based compression unit 124. The dictionary based compression unit 124 may load the selected dictionary SD stored in the dictionary storage unit 110 based on the dictionary information DI.

Although the dictionary determination unit 122 and the dictionary based compression unit 124 are separate from each other in FIG. 1, the dictionary determination unit 122 and the dictionary based compression unit 124 may be implemented as a single processing unit.

Referring to FIGS. 1 through 3, a dictionary includes a plurality of pattern and symbol correspondence relations that define one-to-one correspondence relations between a plurality of patterns and a plurality of symbols. That is, the dictionary may be a table including the plurality of pattern and symbol correspondence relations. Thus, each of the dictionaries stored in the dictionary storage unit 110 includes the plurality of pattern and symbol correspondence relations that define one-to-one correspondence relations between the plurality of patterns and the plurality of symbols.

The data DTA includes the plurality of data patterns. If the data DTA is bitstreams, the data patterns are bit patterns. If a specific data pattern frequently occurs in the data DTA, the data DTA may be compressed by replacing the specific data pattern with a simple symbol. The plurality of data patterns defined in the dictionary may be included in the data DTA. The dictionary may be set by statistically analyzing the data pattern that is most highly likely to be included in the data DTA.

In FIG. 3, 0b denotes a prefix for binary number, and a pattern size is 12 bits. The dictionary of FIG. 3 includes 8 symbols, and thus each symbol can be expressed as 3 bits. Thus, a pattern of 12 bits may be compressed as a symbol of 3 bits.

The dictionary based compression unit 124 replaces a data pattern identical to a pattern defined in the selected dictionary SD among the plurality of data patterns included in the data DTA with a corresponding symbol. Thus, the compression data CDTA includes the corresponding symbol instead of the data pattern with which it is associated.

A data pattern that is not identical to the pattern defined in the selected dictionary SD among the plurality of data patterns included in the data DTA has no corresponding symbol. The data patterns having no corresponding symbols may be included in the compression data CDTA as they are (i.e., uncompressed).

The number of symbols included in the dictionary is the same as the number of patterns that can be defined in the dictionary. Hereinafter, the number of symbols included in the dictionary is referred to as a capacity of the dictionary.

In FIG. 3, the capacity of the dictionary is 8, whereas 6 patterns are only defined in the dictionary. In the dictionary of FIG. 3, patterns corresponding to symbols 7 and 8 are not defined, i.e. reserved.

As described above, the dictionary may reserve one or more symbols, so the number of the patterns defined in the dictionary may be smaller than the capacity of the dictionary. Hereinafter, a portion of the dictionary where patterns are defined is referred to as a fixed pattern portion FP, and a portion thereof where patterns are not defined is referred to as a reserved pattern portion RP.

However, FIG. 3 is an exemplary, and the dictionary may include the same number of patterns as the capacity of the dictionary. In this case, no symbol is reserved.

FIG. 3 is an example of the dictionary for the descriptive convenience, and the inventive concept is not limited to patterns of the dictionary, sizes of patterns, the number of symbols, a ratio of the FP and the RP, and the like.

A variety of storage devices may use the data DTA compression method of FIG. 2. In particular, the data DTA compression method of FIG. 2 may be used in a solid state drive (SSD) among storage devices. Thus, the data processing device 100 of FIG. 1 may be included in the SSD. Hereinafter, for the descriptive convenience, the compression method of FIG. 2 is used in the SSD. However, the inventive concept is not limited thereto, and the compression method of FIG. 2 may be used in other storage devices. The above description also applies to compression methods to be described below.

As described in the present embodiment of the inventive concept, the data DTA is compressed before the data DTA is stored in the storage device, whereby a storage space is efficiently used, and the number of times that the device is written and read may be reduced, which can increases the lifespan of the storage device.

A plurality of dictionaries allows the data processing device to compress the data DTA without an additional physical support, thereby processing the data DTA at a high speed. Further, the selected dictionary SD of the plurality of dictionaries that is most suitable to the data DTA is determined based on the data DTA, and the data DTA is compressed based on the selected dictionary SD, thereby increasing compression efficiency.

Figure 4:
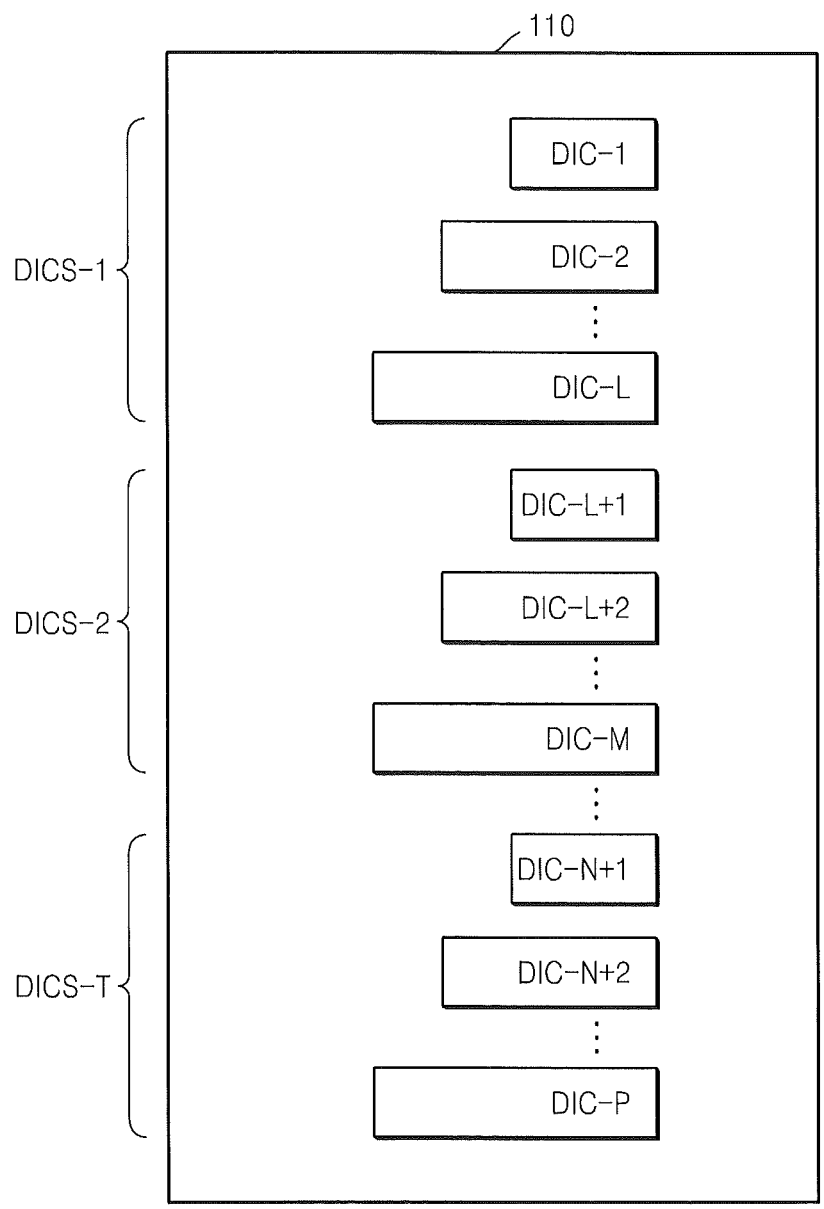
FIG. 4 illustrates the plurality of dictionaries stored in the dictionary storage unit of FIG. 1.

FIG. 4 illustrates a plurality of dictionaries DIC-1, DC-2, . . . , DIC-P stored in the dictionary storage unit 110 of FIG. 1.

Referring to FIG. 4, the plurality of dictionaries DIC-1, DC-2, . . . , DIC-P stored in the dictionary storage unit 110 are classified into a plurality of dictionary sets DICS-1, DISC-2, . . . , DICS-T. That is, each of the plurality of dictionaries DIC-1, DC-2, . . . , DIC-P is included in one of the plurality of dictionary sets DICS-1, DICS-2, . . . , DICS-T.

The plurality of dictionary sets DICS-1, DICS-2, . . . , DICS-T may be identified according to types of the data DTA. For example, the first dictionary set DICS-1 may be a dictionary set used to compress the data DTA of a text type, and the second dictionary set DICS-2 may be a dictionary set used to compress the data DTA of an image type. Data patterns of the data DTA may be different according to types of the data DTA, and thus data compression efficiency may increase by differentiating dictionaries according to types of the data DTA.

Each of the plurality of dictionary sets DICS-1, DICS-2, . . . , DICS-T includes a plurality of dictionaries. For example, the second dictionary set DICS-2 includes a plurality of dictionaries DIC-L+1, DIC-L+2, . . . , DIC-M. In FIG. 4, the plurality of dictionaries included in the same dictionary set have different sizes. This means that the plurality of dictionaries included in the same dictionary set have different capacities. Otherwise, although not shown in FIG. 4, the plurality of dictionary sets DICS-1, DICS-2, . . . , DICS-T may have dictionaries of the same capacity and different pattern sizes.

As described above, the plurality of dictionaries included in the same dictionary set have different capacities or pattern sizes. The number of data patterns or the sizes thereof included in the data DTA differs depending on the size of the data DTA, and thus data compression efficiency may increase by differentiating dictionaries according to size of the data DTA.

Referring again to FIGS. 1 and 4, the data DTA compression method will now be described.

The dictionary determination unit 122 of the compression unit 120 determines a selected dictionary set that is one of the plurality of dictionary sets DICS-1, DICS-2, . . . , DICS-T stored in the dictionary storage unit 110 according to the type of the data DTA, and determines the selected dictionary SD that is one of a plurality of dictionaries included in the selected dictionary set according to the size of the data DTA.

The dictionary determination unit 122 may include an extraction unit (not shown) for extracting information of the data DTA such as the type of the data DTA and size thereof from the data DTA.

The dictionary based compression unit 124 of the compression unit 120 generates the compression data CDTA by compressing a data pattern defined in the selected dictionary SD among the plurality of data patterns included in the data DTA as a corresponding symbol.

The selected dictionary SD is determined from the plurality of dictionaries based on the data DTA, and the data DTA is compressed based on the selected dictionary SD, thereby increasing the compression efficiency.

FIG. 5 is a table showing examples of dictionaries DIC-1, DIC-2, . . . , DIC-L included in the dictionary set DICS-1 among the plurality of dictionaries stored in the dictionary storage unit 110 of FIG. 1. Although one dictionary set is described for descriptive convenience, this may apply to the other dictionary sets DICS-2, . . . , DICS-T stored in the dictionary storage unit 110 of FIG. 1.

Referring to FIG. 5, the dictionary set DICS-1 includes a common dictionary CDIC-1 and the plurality of dictionaries DIC-1, DIC-2, . . . , DIC-L.

The common dictionary CDIC-1 is in common with the plurality of dictionaries DIC-1, DIC-2, . . . , DIC-L included in the dictionary set DICS-1. That is, a pattern and symbol correspondence relation defined in the common dictionary CDIC-1 is in common with the plurality of dictionaries DIC-1, DIC-2, . . . , DIC-L. Thus, the common dictionary CDIC-1 includes the pattern and symbol correspondence relation commonly that is in common with the plurality of dictionaries DIC-1, DIC-2, . . . , DIC-L included in the dictionary set DICS-1, and the plurality of dictionaries DIC-1, DIC-2, . . . , DIC-L included in the dictionary set DICS-1 include the common dictionary CDIC-1. The common dictionary CDIC-1 may be determined by statistically analyzing a data pattern that is most highly likely to be included in the data DTA.

In FIG. 5, the capacity of the common dictionary CDIC-1 is 4, the capacity of the first dictionary DIC-1 is 8, the capacity of the second dictionary DIC-2 is 16, and the capacity of the $L^{th}$ dictionary DIC-L is 128. The plurality of dictionaries DIC-1, DIC-2, . . . , DIC-L may have different capacities.

The capacity of the common dictionary CDIC-1 is smaller than that of the minimum capacity dictionary DIC-1 among the plurality of dictionaries DIC-1, DIC-2, . . . , DIC-L included in the dictionary set DICS-1. However, the capacity of the common dictionary CDIC-1 may be the same as that of the minimum capacity dictionary DIC-1. In this case, the common dictionary CDIC-1 may be the same as the minimum capacity dictionary DIC-1.

As described above, the plurality of dictionaries stored in the dictionary storage unit 110 of FIG. 1 may include the common dictionary for each dictionary set.

The data DTA compression method when each dictionary set includes a common dictionary will now be described with reference to FIGS. 1 and 6.

Figure 6:
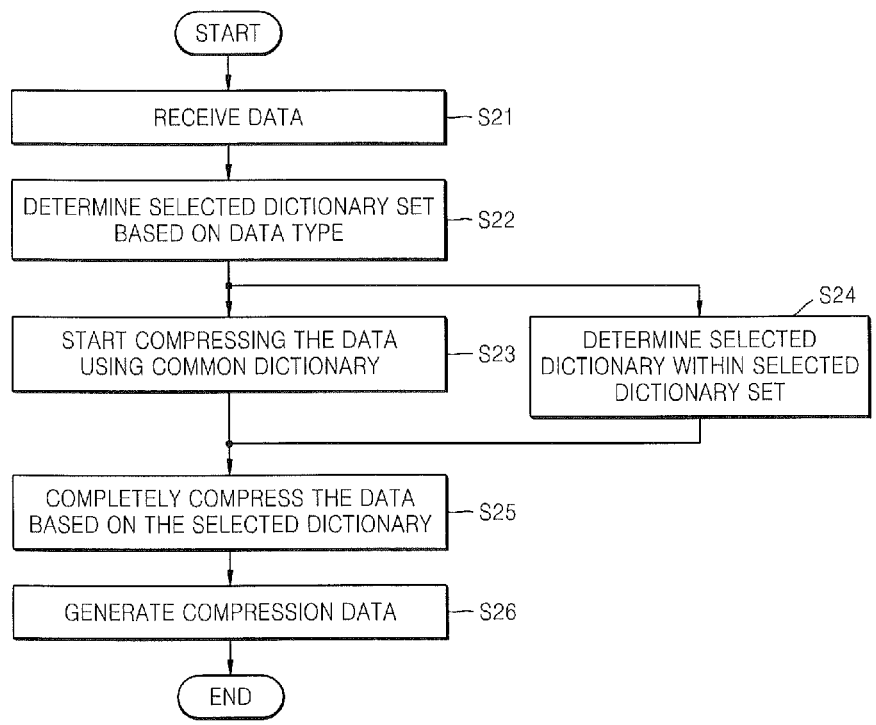
FIG. 6 is a flowchart of a data compression method performed in the data processing device of FIG. 1 according to another embodiment of the inventive concept.

FIG. 6 is a flowchart of a data DTA compression method performed in the data processing device 100 of FIG. 1 according to another embodiment of the inventive concept.

Referring to FIGS. 1 and 6, the compression unit 120 receives the data DTA (operation S21). The dictionary determination unit 122 of the compression unit 120 determines a selected dictionary set that is one of a plurality of dictionary sets stored in the dictionary storage unit 110 according to the type of the data DTA (operation S22).

The dictionary based compression unit 124 of the compression unit 120 compresses the data DTA using a common dictionary included in the selected dictionary set (operation S23). The dictionary determination unit 122 determines a selected dictionary SD that is one of a plurality of dictionaries included in the selected dictionary set according to the size of the data DTA (operation S24). Operations S23 and S24 may be simultaneously performed.

The dictionary based compression unit 124 completely compresses the data DTA based on the selected dictionary SD (operation S25), and generates the compression data CDTA (operation S26).

That is, the dictionary based compression unit 124 compresses the data DTA based on the common dictionary included in the selected dictionary set after the selected dictionary set is determined before the selected dictionary SD is determined, and compresses the data DTA based on the selected dictionary SD after the selected dictionary SD is determined.

The selected dictionary SD includes the common dictionary, and thus the dictionary based compression unit 124 may continue compression of the data DTA based on the selected dictionary SD while compressing the data DTA based on the common dictionary.

If there is no common dictionary, the dictionary based compression unit 124 does not compress the data DTA until the selected dictionary SD is determined. If the common dictionary is used, the dictionary based compression unit 124 starts compression of the data DTA before the selected dictionary SD is determined.

As described above, the data DTA is compressed based on the common dictionary after the selected dictionary set is determined before the selected dictionary SD is determined, thereby preventing the compression of the data DTA from being delayed during the time taken to determine the selected dictionary SD. Thus, the time taken to compress the data DTA is reduced, thereby increasing performance of the data processing device 100.

Figure 7:
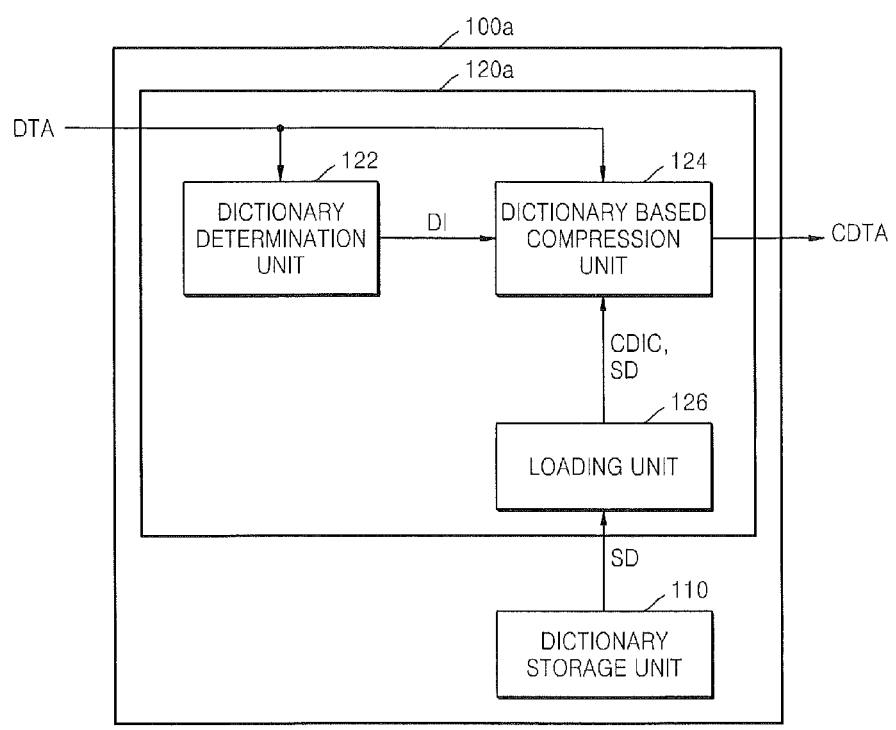
FIG. 7 is a block diagram of a data processing device for a storage device according to another embodiment of the inventive concept.
Figure 8:
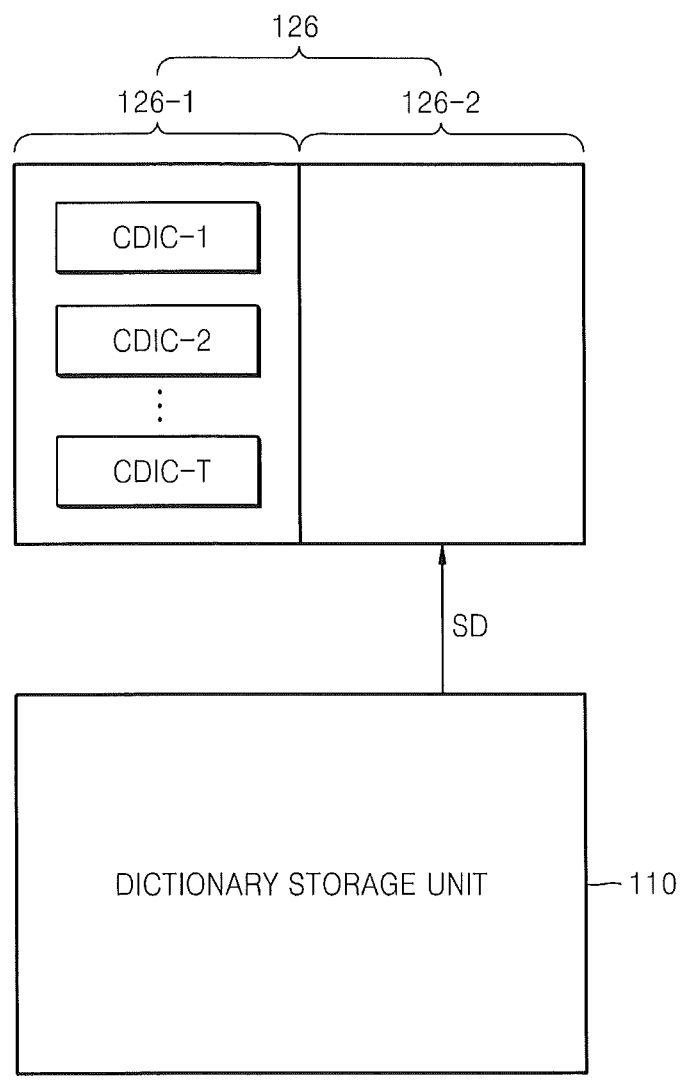
FIG. 8 is an exemplary block diagram of a loading unit and a dictionary storage unit of FIG. 7.

FIG. 7 is a block diagram of a data processing device 100*a* for a storage device according to another embodiment of the inventive concept. FIG. 8 is an exemplary block diagram of a loading unit 126 and the dictionary storage unit 110 of FIG. 7. The data processing device 100*a* of FIG. 7 may include the same elements as those of the data processing device 100 of FIG. 1. The same reference numerals denote the same elements in FIGS. 1 and 7.

Referring to FIGS. 7 and 8, the data processing device 100*a* includes the dictionary storage unit 110 and a compression unit 120*a* that receives the data DTA and generates the compression data CDTA. The compression unit 120*a* includes the dictionary determination unit 122, the dictionary based compression unit 124, and the loading unit 126.

The loading unit 126 loads information necessary for an operation of the compression unit 120*a*. A plurality of dictionaries may be loaded in the loading unit 126. However, the loading unit 126 may load only the selected dictionary SD among the plurality of dictionaries due to capacity and efficiency of the loading unit 126.

The loading unit 126 may include a preset region 126-1 and a load region 126-2. A plurality of common dictionaries CDIC-1, CDIC-2, . . . , CDIC-T included in a plurality of dictionary sets are loaded as default in the preset region 126-1. The selected dictionary SD may be loaded in the load region 126-2.

The dictionary determination unit 122 determines a selected dictionary set that is one of the plurality of dictionary sets according to the type of the data DTA, and determines the selected dictionary SD that is one of a plurality of dictionaries included in the selected dictionary set according to the size of the data DTA.

If the selected dictionary SD is determined, the compression unit 120*a* loads the selected dictionary SD among the plurality of dictionaries stored in the dictionary storage unit 110 to the load region 126-2 of the loading unit 126.

The dictionary based compression unit 124 compresses the data DTA based on a common dictionary CDIC included in the selected dictionary set after the selected dictionary set is determined before the selected dictionary SD is loaded onto the loading unit 126. The common dictionary CDIC is already loaded onto the preset region 126-1 of the loading unit 126, and thus the compression unit 120*a* does not need to load the common dictionary CDIC.

The dictionary based compression unit 124 compresses the data DTA based on the selected dictionary SD after the selected dictionary SD is loaded onto the loading unit 126.

As described above, the common dictionary CDIC is stored in the loading unit 126 of the compression unit 120*a*, and the selected dictionary SD is loaded onto the loading unit 126 if necessary, thereby solving a capacity problem of the loading unit 126. Further, the data DTA is compressed based on the common dictionary CDIC before the selected dictionary SD is loaded onto the loading unit 126, which prevents the time taken to compress the data DTA from being delayed, thereby increasing performance of the data processing device 100*a*.

However, the data DTA may include a data pattern that is not identical to patterns defined in a dictionary. If a data pattern that is not defined in the dictionary frequently occur in the data DTA, it is efficient to add the data pattern to the dictionary to update the dictionary.

Hereinafter, a method of updating the dictionary will now be described. For descriptive convenience, a pattern defined as default in the dictionary is referred to as a fixed pattern, and a pattern added in the dictionary is referred to as an additional pattern.

Figure 9:
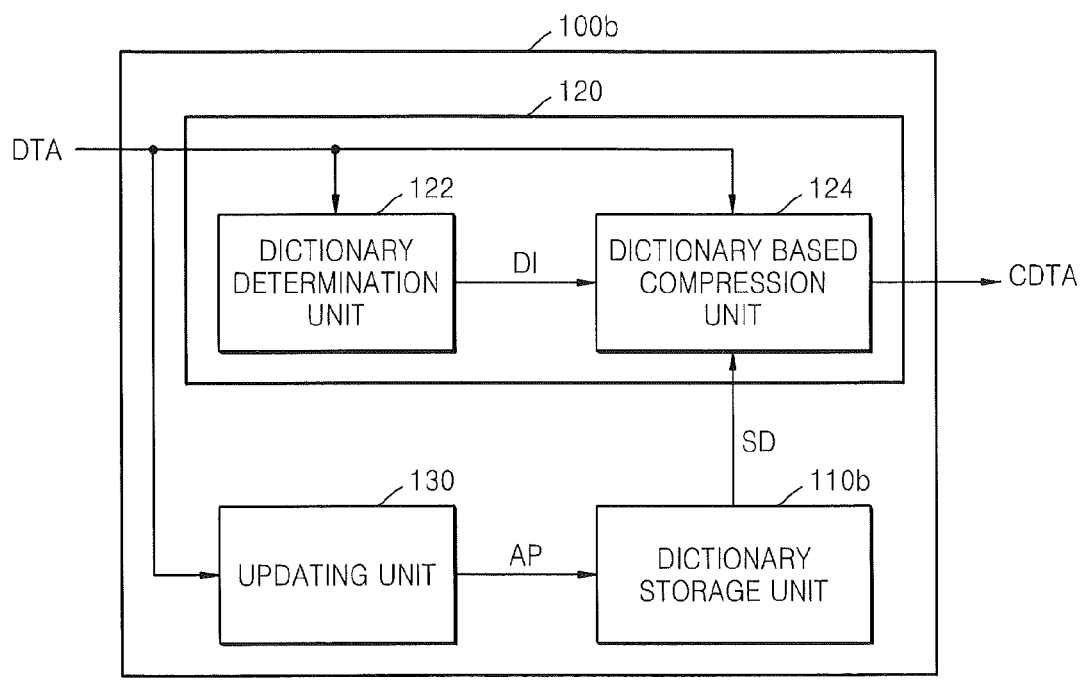
FIG. 9 is a block diagram of a data processing device for a storage device according to another embodiment of the inventive concept.

FIG. 9 is a block diagram of a data processing device 100*b* for a storage device according to still another embodiment of the inventive concept.

The data processing device 100*b* of FIG. 9 may include the same elements as those of the data processing device 100 of FIG. 1. The same reference numerals denote the same elements in FIGS. 1 and 9.

Referring to FIG. 9, the data processing device 100*b* includes a dictionary storage unit 110*b*, the compression unit 120, and an updating unit 130. The data processing device 100*b* of FIG. 9 may further include the updating unit 130 compared to the data processing device 100 of FIG. 1. However, the updating unit 130 of FIG. 9 may be included in the data processing device 100*a* of FIG. 7.

The updating unit 130 extracts the additional pattern AP from the data DTA, transfers the additional pattern AP to the dictionary storage unit 110*b*, and updates a dictionary stored in the dictionary storage unit 110*b*. Although the updating unit 130 and the dictionary storage unit 110*b* are separated from each other in FIG. 9, the updating unit 130 and the dictionary storage unit 110*b* may be implemented as one processing unit.

The updating unit 130 may extract the additional pattern AP from the data DTA by using various methods. For example, if one piece of the data DTA includes a specific data pattern that is not defined in the dictionary and the number of the specific data patterns included in the data DTA is above a reference value, the updating unit 130 may extract the specific data pattern as the additional pattern AP.

Alternatively, the updating unit 130 may extract the additional pattern AP from a data set including pieces of the data DTA. For example, if the pieces of the data DTA included in the data set include a specific data pattern that is not defined in the dictionary and the number of the specific data patterns included in the data set is above a reference value, the updating unit 130 may extract the specific data pattern as the additional pattern AP.

Referring again to FIG. 3, the dictionary may include a fixed pattern portion FP in which a fixed pattern is defined and a reserved pattern portion RP in which the fixed pattern is not defined. The additional pattern AP may be added to the RP. In the dictionary of FIG. 3, the symbols 7 and 8 are included in the RP. The additional pattern AP may be added for the symbol 7 or symbol 8. If the additional patterns AP are added for both of the symbols 7 and 8, no symbol is reserved in the dictionary, and thus the dictionary may not be updated further unless another entry is removed.

For the descriptive convenience, a dictionary saturation status is defined as a status in which since no symbol is reserved in the dictionary, the dictionary may not be updated further. If the dictionary is saturated, the number of patterns (the fixed pattern and the additional pattern AP) defined in the dictionary is the same as the capacity of the dictionary.

As described above, the updating of the dictionary may increase compression efficiency. However, the number of additional patterns that can be added in the dictionary may be limited due to the capacity of the dictionary. A method of solving a limited update due to the capacity of the dictionary will now be described below.

FIG. 10 is a table showing one example of a dictionary stored in the dictionary storage unit 110*b* of FIG. 9. Although one dictionary is described in FIG. 10 for the descriptive convenience, this may apply to a plurality of dictionaries stored in the dictionary storage unit 110*b* of FIG. 9.

Referring to FIGS. 9 and 10, the dictionary DIC-1 includes a fixed table FT-1 and an additional table AT-1. The fixed table FT-1 of FIG. 10 is the same as the dictionary of FIG. 3. That is, the dictionary DIC-1 of FIG. 10 includes the additional table AT-1, in addition to the dictionary of FIG. 3.

The fixed table FT-1 includes a fixed pattern portion FP in which a fixed pattern is defined and a reserved pattern portion RP in which the fixed pattern is not defined. The fixed pattern portion FP corresponds to symbols 1 through 6 of the fixed table FT-1. The reserved pattern portion RP corresponds to symbols 7 and 8 of the fixed table FT-1. However, FIG. 10 is exemplary, and whether the fixed table FT-1 includes the RP and the number of symbols included in the RP may be modified in various ways.

In the additional table AT-1, the symbols 1 through 8 are all reserved.

The reserved pattern portion RP of the fixed table FT-1 and the additional table AT-1 are used to add an additional pattern AP. The additional pattern AP may be added for reserved symbols corresponding to the reserved pattern portion RP and additional tables AT-1.

The additional table AT-1 may be updated after the fixed table FT-1 is saturated. That is, when the fixed table FT-1 is not saturated, the additional pattern AP is added in the fixed table FT-1, and when the fixed table FT-1 is saturated, the additional pattern AP may be added in the additional table AT-1.

If an additional pattern AP is extracted from data DTA, the additional pattern AP may be first added for the symbol 7 or symbol 8 corresponding to the reserved pattern portion RP of the fixed table FT-1. If additional patterns APs are added for the symbols 7 and 8, the fixed table FT-1 is saturated and thus no more another additional pattern AP may be stored in the fixed table FT-1. If the fixed table FT-1 is saturated, other additional patterns APs may be added in the order of the symbols 1 through 8 of the additional table AT-1.

In FIG. 10, the capacities of the additional table AT-1 and the fixed table FT-1 are both 8. Although the additional table AT-1 of FIG. 10 is described as a static table, the additional table AT-1 may be a dynamic table. That is, if the fixed table FT-1 is not saturated, the additional table AT-1 may not be generated, and, if the fixed table FT-1 is saturated, the capacity of the additional table AT-1 may change depending on the updating of an additional pattern AP. However, the maximum capacity of the additional table AT-1 may be the same as that of the fixed table FT-1. If the additional table AT-1 is the dynamic table, a dictionary storage unit 110*b* may be efficiently used.

Although one dictionary DIC-1 includes one additional table AT-1 in FIG. 10, one or more additional tables may be included in the dictionary DIC-1.

As described above, the dictionary DIC-1 may increase its capacity by using the additional table AT-1. Further, if the additional table AT-1 is a dynamic table, the capacity of the dictionary DIC-1 may increase while a dictionary storage unit may be efficiently used.

Figure 11:
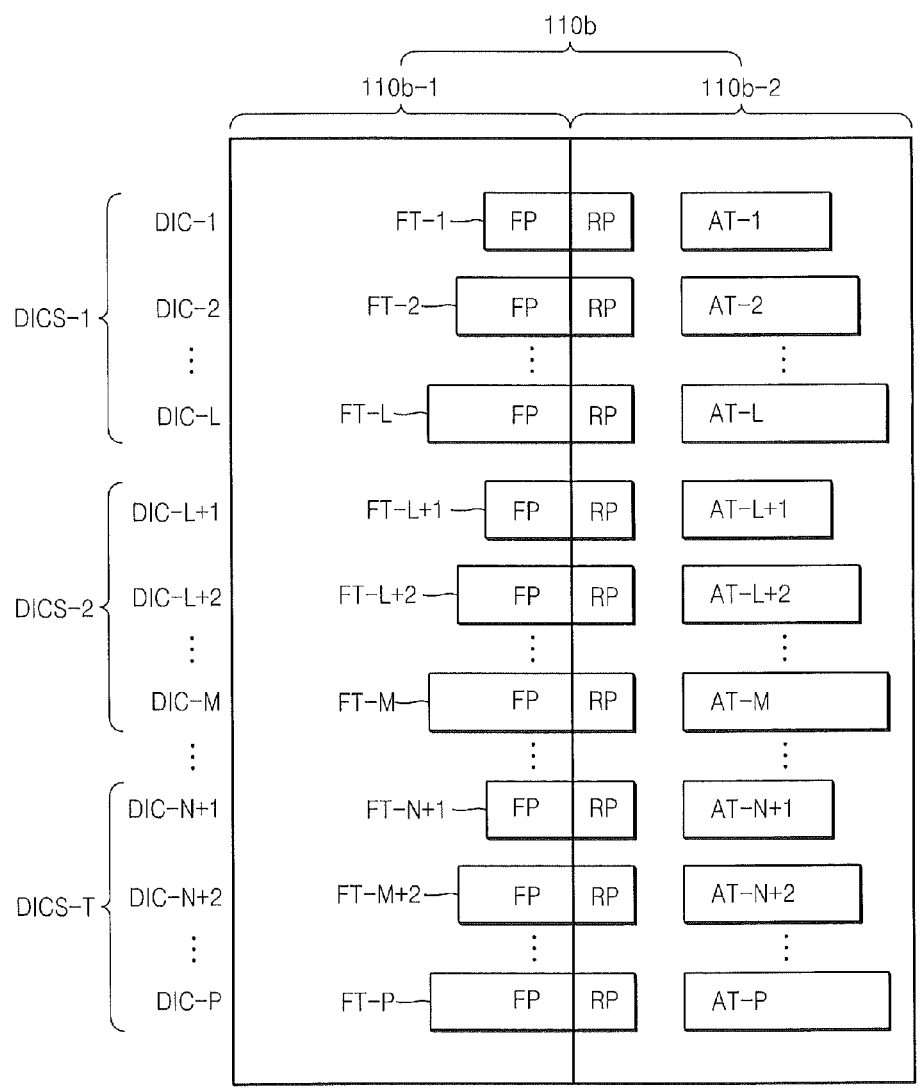
FIG. 11 is an exemplary diagram of the dictionary storage unit of FIG. 9.

FIG. 11 is an exemplary diagram of the dictionary storage unit 110*b* of FIG. 9.

Referring to FIGS. 9 and 11, each of the dictionaries DIC-1, DIC-2, . . . , DIC-P stored in the dictionary storage unit 110*b* includes fixed table FT-1, FT-2, . . . , FT-P and additional table AT-1, AT-2, AT-P. Each of the fixed tables FT-1, FT-2, . . . , FT-P includes a fixed pattern portion FP and a reserved pattern portion RP.

The dictionary storage unit 110*b* may include a fixed region 110*b*-1 and an additional region 110*b*-2. The fixed pattern portions FPs of the fixed tables FT-1, FT-2, . . . , FT-P may be stored in the fixed region 110*b*-1 of the dictionary storage unit 110*b*. The reserved pattern potions RPs of the fixed tables FT-1, FT-2, . . . , FT-P and the additional tables AT-1, AT-2, . . . , AT-P may be stored in the additional region 110*b*-2 of the dictionary storage unit 110*b*. Reading may be only possible in the fixed region 110*b*-1, and both reading and writing may be possible in the additional region 110*b*-2.

The additional region 110*b*-2 of the dictionary storage unit 110*b* in which reserved pattern portions RPs of the fixed tables FT-1, FT-2, . . . , FTP and the additional tables AT-1, AT-2, . . . , AT-P are stored is a region where both reading and writing are possible, and thus an additional pattern AP may be stored or deleted in or from the dictionaries DIC-1, DIC-2, . . . , DIC-P. However, only when a symbol corresponding to an additional pattern AP is not used, the additional pattern AP may be deleted from the dictionaries DIC-1, DIC-2, . . . , DIC-P.

Figure 12:
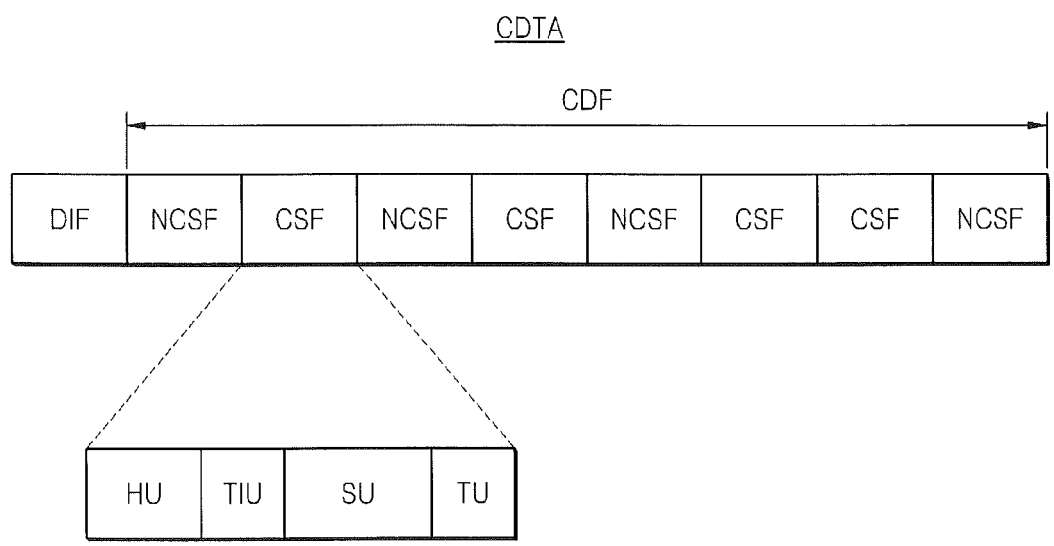
FIG. 12 is an exemplary format of compression data generated by a data processing device according to an embodiment of the inventive concept.

FIG. 12 is an exemplary format of the compression data CDTA generated by a data processing device according to an embodiment of the inventive concept.

Referring to FIG. 12, the compression data CDTA includes a selected dictionary instruction field DIF and a compression data field CDF.

The selected dictionary instruction field DIF indicates the selected dictionary SD (refer to FIG. 1) used to generate the compression data CDTA. The compression data field CDF indicates data compressed based on the selected dictionary SD.

The compression data field CDF includes one or more compression sub fields CSF. The compression data field CDF may include a non-compression sub field NCSF.

The compression sub field CSF is a sub field replaced with a corresponding symbol when a data pattern included in the data DTA is identical to a pattern defined in the selected dictionary SD. The non-compression sub field NCSF is a sub field that is not replaced with a corresponding symbol when the data pattern included in the data DTA is not identical to the patterns defined in the selected dictionary SD.

The compression sub field CSF includes a header unit HU, a table instruction unit TIU, a symbol unit SU, and a tail unit TU.

The header unit HU indicates a start of the compression sub field CSF in the compression data CDTA. The header unit HU serves as a marker for identifying the compression sub field CSF in the compression data CDTA.

The table instruction unit TIU is a table instructor used to indicate the fixed table FT or the additional table AT which defines a data pattern compressed by the compression sub field CSF (refer to FIG. 11). If the data pattern is defined in the fixed table FT of the selected dictionary SD, the table instruction unit TIU indicates the fixed table FT, and, if the data pattern is defined in the additional table AT of the selected dictionary SD, the table instruction unit TIU indicates the additional table AT.

For example, if the selected dictionary SD includes one fixed table FT and three additional tables AT, the size of the table instruction unit TIU may be 2 bits. If the data processing device includes no updating unit, has no function of updating a dictionary, or has no function of generating the additional table AT, the table instruction unit TIU may be omitted in the compression data CDTA.

The symbol unit SU is a symbol corresponding to the data pattern compressed by the compression sub field CSF among symbols defined in the selected dictionary SD.

The tail unit TU indicates an end of the compression sub field CSF in the compression data CDTA. The tail unit TU serves as a marker for identifying the end of the compression sub field CSF in the compression data CDTA. The tail unit TU may be omitted. For example, the size of the symbol unit SU may be fixed according to the capacity of the selected dictionary SD. If the size of the symbol unit SU of the compression data CDTA is fixed, the end of the compression sub field CSF may be identified without the tail unit TU. In this case, the tail unit TU may be omitted.

Figure 13:
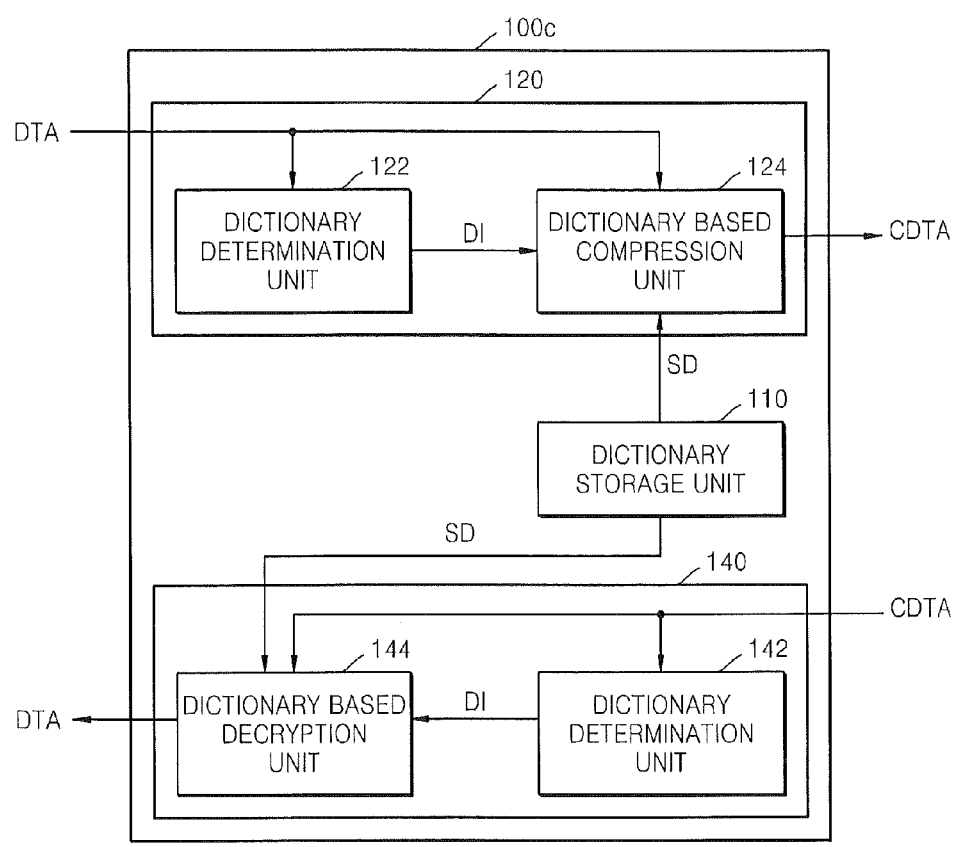
FIG. 13 is a block diagram of a data processing device according to another embodiment of the inventive concept.

FIG. 13 is a block diagram of a data processing device 100c according to still another embodiment of the inventive concept. The data processing device 100c of FIG. 13 may include the same elements as those of the data processing device 100 of FIG. 1. The same reference numerals denote the same elements in FIGS. 1 and 13.

Referring to FIG. 13, the data processing device 100c includes the dictionary storage unit 110, the compression unit 120, and a decryption unit 140. The data processing device 100c of FIG. 13 may further include the decryption unit 140 compared to the data processing device 100 of FIG. 1. However, the decryption unit 140 of FIG. 13 may be included in the data processing devices 100a and 100b of FIGS. 7 and 9.

The decryption unit 140 receives the compression data CDTA, and reconstructs the data DTA by decrypting the compression data CDTA based on the selected dictionary SD. The decryption unit 140 may use the dictionary storage unit 110 in common with the compression unit 120.

The decryption unit 140 includes a dictionary determination unit 142 and a dictionary based decryption unit 144.

The dictionary determination unit 142 determines the selected dictionary SD that is one of the dictionaries stored in the dictionary storage unit 110 by using the selected dictionary instruction field DIF (of FIG. 12) included in the compression data CDTA. The dictionary based decryption unit 144 reconstructs the data DTA by decrypting the compression data CDTA based on the selected dictionary SD.

The dictionary determination unit 142 may transfer dictionary information DI regarding the selected dictionary SD to the dictionary based decryption unit 144. The dictionary based decryption unit 144 may load the selected dictionary SD stored in the dictionary storage unit 110 based on the dictionary information DI.

Although the dictionary determination unit 142 and the dictionary based decryption unit 144 are separated from each other in FIG. 13, the dictionary determination unit 142 and the dictionary based decryption unit 144 may be implemented as one processing unit.

Figure 14:
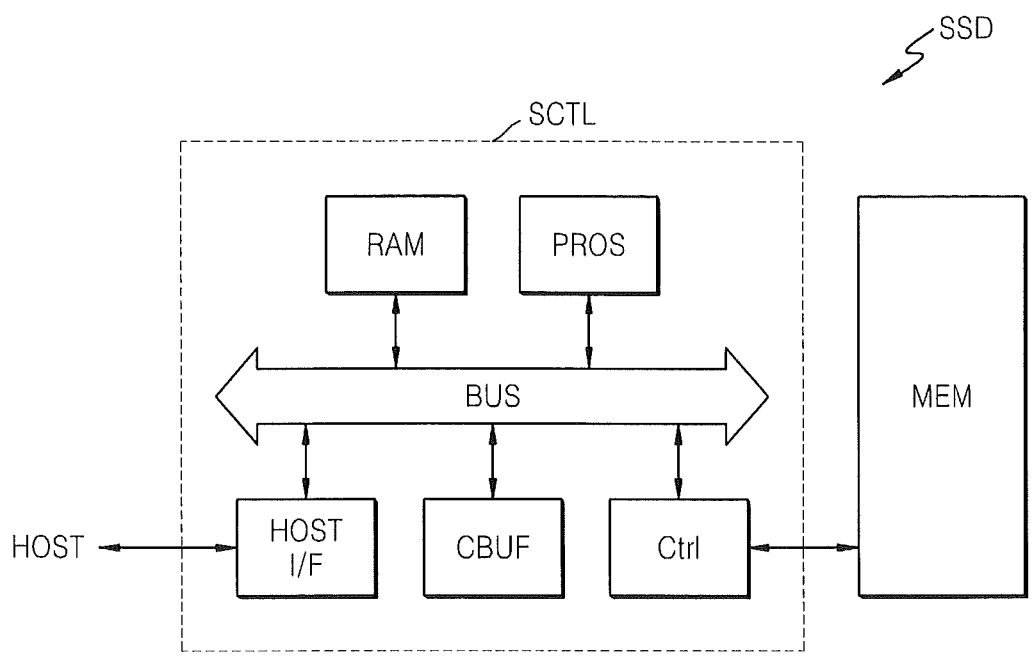
FIG. 14 is a block diagram of a solid state drive (SSD) according to an embodiment of the inventive concept.

FIG. 14 is a block diagram of a solid state drive (SSD) according to an embodiment of the inventive concept.

Referring to FIG. 14, the SSD may include an SSD controller SCTL and a flash memory MEM. The SSD controller SCTL may include a processor PROS, random access memory RAM, a cache buffer CBUF, and a memory controller Ctrl, which are connected to a bus BUS. The processor PROS controls the memory controller Ctrl to transmit and receive data to and from the flash memory MEM in response to a request (a command, an address, or data) of a host. The processor PROS and the memory controller Ctrl of the SSD may be realized as one advanced RISC machine (ARM) processor. Data required to operate the processor PROS may be loaded to the random access memory RAM.

A host interface HOST I/F receives the request of the host and transmits the request of the host to the processor PROS, or transmits data from the flash memory MEM to the host. The host interface HOST I/F may interface with the host by using various interface protocols such as universal serial bus (USB), man machine communication (MMC), peripheral component interconnect-express (PCI-E), serial advanced technology attachment (SATA), parallel advanced technology attachment (PATA), small computer system interface (SCSI), enhanced small device interface (ESDI), and intelligent drive electronics (IDE). Data to be transmitted to the flash memory MEM, or transmitted from the flash memory MEM may be temporarily stored in the cache buffer CBUF. The cache buffer CBUF may be, for example, static random-access memory (SRAM).

Figure 15A:
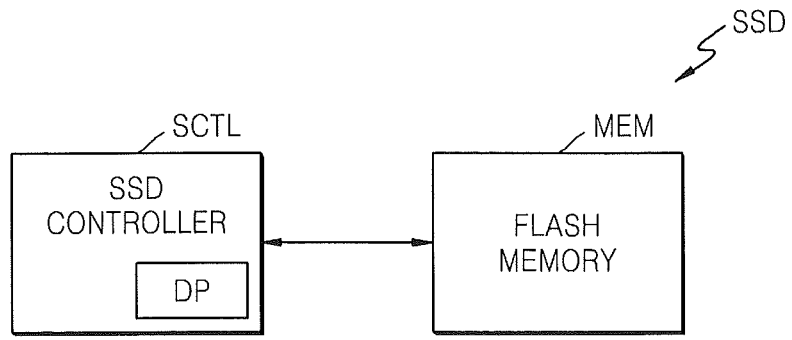
FIGS. 15A through 15C are diagrams of locations of data processing devices included in a SSD according to an embodiment of the inventive concept.
Figure 15B:
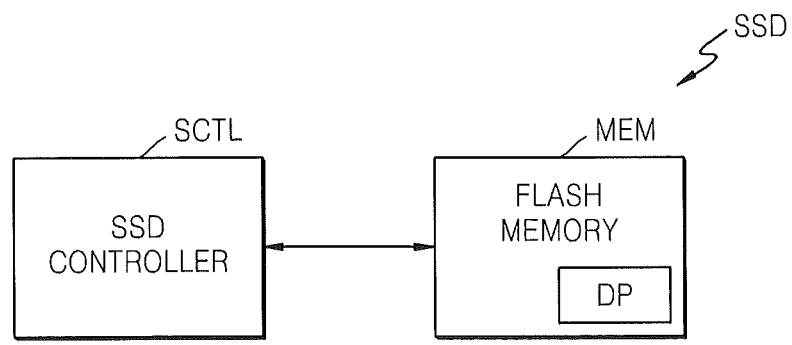
Figure 15C:
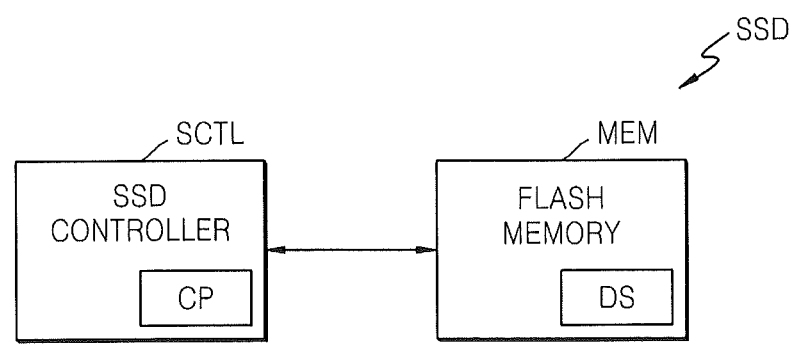

FIGS. 15A through 15C are diagrams of locations of data processing devices DP included in a SSD according to an embodiment of the inventive concept.

The data processing device DP according to the embodiment of the inventive concept may be included in the SSD controller SCTL of FIG. 15A, or the flash memory MEM of FIG. 15B. In particular, if the data processing device DP is included in the flash memory MEM, the data processing device DP may be included a compression engine (not shown) included in the flash memory MEM. Alternatively, referring to FIG. 15C, a compression unit CP of the data processing device DP may be included in the SSD controller SCTL, and a dictionary storage unit DS of the data processing device DP may be included in the flash memory MEM.

Figure 16:
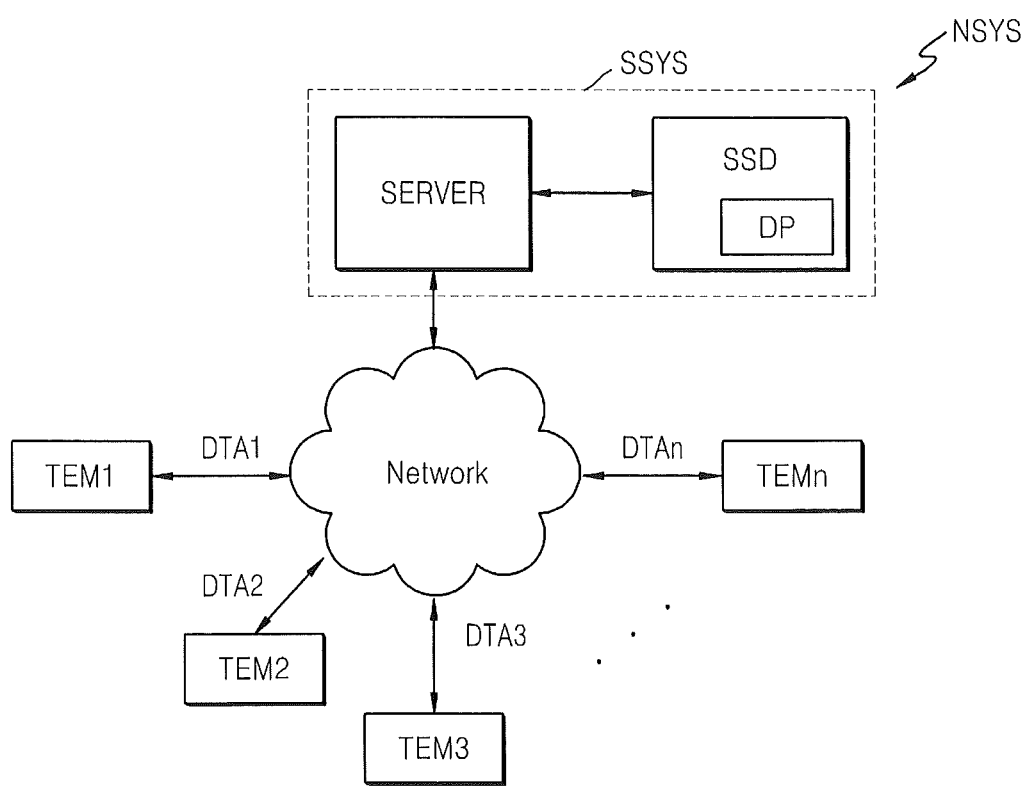
FIG. 16 is a block diagram of a network system including a data processing device, according to an embodiment of the inventive concept.

FIG. 16 is a block diagram of a network system NSYS including the data processing device DP, according to an embodiment of the inventive concept.

Referring to FIG. 16, a solid state drive SSD including the data processing device DP may be included in a server system SSYS connected in the network system NSYS.

The network system NSYS may include the server system SSYS and a plurality of terminals TEM1 through TEMn, which are connected to a network. The server system SSYS may include a server SERVER for processing a request received from the terminals TEM1 through TEMn, and the solid state drive SSD for storing data DTA1 through DTAn corresponding to the request received from the terminals TEM1 through TEMn. In this case, the solid state drive SSD illustrated in FIG. 16 may be the solid state drive SSD illustrated in FIG. 14. That is, the solid state drive SSD illustrated in FIG. 16 may include the SSD controller SCTL and the flash memory MEM illustrated in FIG. 14.

The data DTA1 through DTAn that is transmitted from the terminals TEM1 through TEMn to the server system SSYS and is stored in the server system SSYS may be compressed before being stored in the flash memory MEM as described above.

Figure 17:
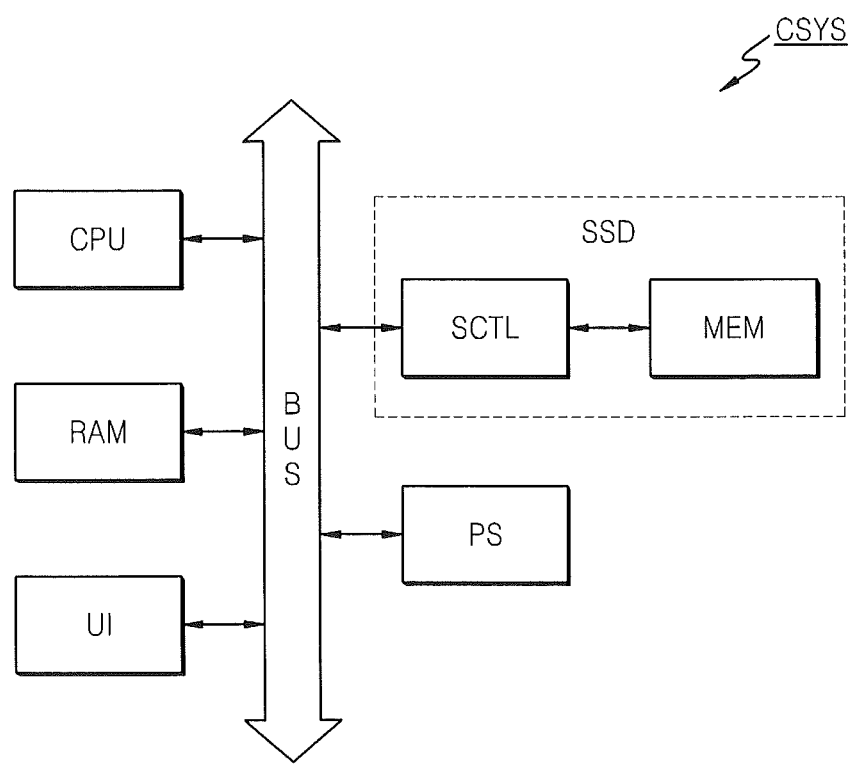
FIG. 17 is a block diagram of a computing system according to an embodiment of the inventive concept.

FIG. 17 is a block diagram of a computing system CSYS according to an embodiment of the inventive concept.

Referring to FIG. 17, the computing system CSYS includes a processor CPU, a user interface UI, and a solid state drive SSD, which are electrically connected to a bus BUS. The solid state drive SSD includes an SSD controller SCTL and a flash memory MEM. N-bit data (N is an integer equal to or greater than 1) processed or to be processed by the processor CPU may be stored in the flash memory MEM by the control of the SSD controller SCTL. The solid state drive SSD illustrated in FIG. 17 may be the solid state drive SSD illustrated in FIG. 14.

The computing system CSYS may further include a power supply device PS. The computing system CSYS may further include a system memory such as random access memory RAM.

If the computing system CSYS is a mobile device, a battery for supplying an operation voltage of the computing system CSYS and a modem such as a baseband chipset may be additionally provided. Also, it will be understood by one of ordinary skill in the art that the computing system CSYS may further include an application chipset, a camera image processor (CIS), mobile dynamic random access memory (DRAM), and the like, and thus detailed descriptions thereof will not be provided here.

According to the embodiments of the inventive concept, a storage device for efficiently compressing data and a data processing device for the storage device may be provided.

Data is compressed before being stored in a storage device, and thus a storage space may be efficiently used, and the number of data reading and writing may be reduced, and thus a lifespan of the storage device may increase.

A plurality of dictionaries is included in a data processing device, and thus data may be compressed without an additional physical support, thereby processing the data at a high speed. A selected dictionary that is the most suitable to the data based on the data is determined among the plurality of dictionaries, and the data is compressed based on the selected dictionary, thereby increasing compression efficiency.

A common dictionary is used to compress the data after a selected dictionary set is determined before the selected dictionary is determined, thereby preventing data compression from being delayed during a time taken to determine the selected dictionary. Thus, a data compression time is reduced, which may enhance performance of the data processing device.

A dictionary is updated, and thus compression efficiency may increase, and an additional table is used, and thus a capacity of the dictionary may increase.

A dictionary based data compression method used for the storage device and the data processing device according to the embodiments of the inventive concept described above uses one of various compression methods, thereby increasing efficiency of the storage device and the data processing device.

While the inventive concept has been particularly shown and described with reference to exemplary embodiments thereof, it will be understood that various changes in form and details may be made therein without departing from the spirit and scope of the following claims.

What is claimed:

1. A data processing device for a storage device comprising:
    a dictionary storage unit configured to store a plurality of dictionaries;
    a compression unit configured to determine a selected dictionary comprising one of the plurality of dictionaries based on received data and compress the received data using the selected dictionary to provide compressed data,
    wherein each of the plurality of dictionaries comprises a plurality of pattern-symbol correspondence relations defining a one-to-one correspondence between respective ones of a plurality of patterns and respective ones of a plurality of symbols; and
    an updating unit configured to extract an additional pattern from the received data and add the additional pattern to the plurality of dictionaries, wherein the additional pattern is different from the plurality of patterns, and
    wherein each of the plurality of dictionaries comprises a fixed table and an additional table, wherein the fixed table comprises a fixed pattern portion in which the plurality of patterns are defined and a reserved pattern portion in which the plurality of patterns are not defined, wherein the updating unit is configured to add the additional pattern in the reserved pattern portion of the fixed table if the fixed table is not saturated, and add the additional pattern in the additional table if the fixed table is saturated.

2. A storage device comprising:
    a compression unit configured to determine a selected dictionary that is one of a plurality of dictionaries based on received data, compress the received data using the selected dictionary to provide compressed data;
    a memory configured to store the plurality of dictionaries and store the compressed data,
    wherein each of the plurality of dictionaries comprises a plurality of pattern-symbol correspondence relations defining a one-to-one correspondence between respective ones of a plurality of patterns and respective ones of a plurality of symbols; and
    an updating unit configured to extract an additional pattern from the received data and add the additional pattern to the plurality of dictionaries, wherein the additional pattern is different from the plurality of patterns, and
    wherein each of the plurality of dictionaries comprises a fixed table and an additional table, wherein the fixed table comprises a fixed pattern portion in which the plurality of patterns are defined and reserved pattern portion in which the plurality of patterns are not defined,
    wherein the updating unit is configured to add the additional pattern in the reserved pattern portion of the fixed table if the fixed table is not saturated, and add the additional pattern in the additional table if the fixed table is saturated.

3. A method of operating a solid state disk drive (SSD) comprising:
    selecting a dictionary for use in compressing received data to provide a selected dictionary, from among a plurality of dictionaries, based on a type of the received data and based on a size of the received data, wherein the size comprises a range of values of the received data;
    accessing a symbol stored in the selected dictionary using the received data as an index into the dictionary, wherein accessing the symbol stored in the selected dictionary further comprises accessing a common dictionary included in a selected dictionary set using the received data to index into the common dictionary to provide a common symbol before the selected dictionary is determined and then accessing the selected dictionary included in the selected dictionary set using the received data to index into the selected dictionary to provide the symbol after the selected dictionary is determined; and
    including the symbol as part of compressed data for storage in the SSD.

4. The data processing device of claim 1, wherein the selected dictionary is determined based on a type of the received data and a size of the received data.

5. The data processing device of claim 1, wherein each of the plurality of dictionaries is included in one of a plurality of dictionary sets,
    wherein the compression unit is configured to determine a selected dictionary set comprising one of the dictionary sets based on the type of the received data, and determine the selected dictionary included in the selected dictionary set based on the size of the received data.

6. The data processing device of claim 1, wherein the compressed data comprises a selected dictionary instruction field to indicate the selected dictionary and a compression data field to indicate a data pattern included in the data and compressed using the selected dictionary,
    wherein the compression data field comprises a table instruction unit indicating the fixed table or the additional table which defines the data pattern.

7. The data processing device of claim 1, further comprising:

a decryption unit configured to receive the compressed data, and reconstruct the data by decrypting the compressed data using the selected dictionary.

8. The storage device of claim 2, wherein the memory comprises a flash memory.

9. A method according to claim 3 wherein the type comprises text data, image data, audio data, or video data.

10. A method according to claim 3 wherein each of the dictionaries in the plurality of dictionaries other than the common dictionary includes a portion thereof that corresponds to the common dictionary.

11. The data processing device of claim 5, wherein each of the plurality of dictionary sets comprises a common dictionary, and the common dictionary comprises a pattern-symbol correspondence relation that has in common with shared among the plurality of dictionaries included in the each of the plurality of dictionary sets.

12. The data processing device of claim 6, wherein the additional pattern is a candidate to be deleted from the plurality of dictionaries.

13. The data processing device of claim 11, wherein the compression unit is configured to compress the received data using the common dictionary included in the selected dictionary set after the selected dictionary set is determined and before the selected dictionary is determined, and compress the data using the selected dictionary after the selected dictionary is determined.

14. The data processing device of claim 11, wherein the compression unit comprises a loading unit comprising a preset region and a load region, wherein a plurality of common dictionaries included in the plurality of dictionary sets is loaded in the preset region.

15. The data processing device of claim 14, wherein the compression unit is configured to load the selected dictionary from the dictionary storage unit to the load region of the loading unit.

16. The data processing device of claim 15, wherein the compression unit is configured to compress the received data using the common dictionary included in the selected dictionary set after the selected dictionary set is determined and before the selected dictionary is loaded to the loading unit, and compress the received data using the selected dictionary after the selected dictionary is loaded to the loading unit.

* * * * *